(12) United States Patent
Frank

(10) Patent No.: US 7,240,229 B2
(45) Date of Patent: Jul. 3, 2007

(54) SYSTEM AND METHOD FOR ROUTING DATA AND POWER TO EXTERNAL DEVICES

(75) Inventor: Andrew Frank, Woodland Hills, CA (US)

(73) Assignee: Digi International Inc., Minnetonka, MN (US)

( * ) Notice: Subject to any disclaimer, the term of this patent is extended or adjusted under 35 U.S.C. 154(b) by 401 days.

(21) Appl. No.: 10/865,018

(22) Filed: Jun. 10, 2004

(65) Prior Publication Data

US 2005/0278554 A1 Dec. 15, 2005

(51) Int. Cl.
*G06F 1/26* (2006.01)
*G06F 1/30* (2006.01)
*G06F 1/32* (2006.01)

(52) U.S. Cl. ............ 713/330; 713/300; 713/340; 713/320; 713/323; 713/324

(58) Field of Classification Search ............... None
See application file for complete search history.

(56) References Cited

U.S. PATENT DOCUMENTS

| | | | |
|---|---|---|---|
| 5,483,656 A * | 1/1996 | Oprescu et al. | 713/320 |
| 5,729,667 A * | 3/1998 | Lee | 358/1.14 |
| 5,852,544 A | 12/1998 | Lee | |
| 6,357,011 B2 * | 3/2002 | Gilbert | 713/300 |
| 6,934,788 B2 | 8/2005 | Laity et al. | |
| 2002/0188875 A1 | 12/2002 | Hwang et al. | |
| 2003/0110403 A1 | 6/2003 | Crutchfield et al. | |
| 2005/0218725 A1 * | 10/2005 | Strauss | 307/82 |

FOREIGN PATENT DOCUMENTS

| | | |
|---|---|---|
| DE | 29511762 | 9/1995 |
| WO | WO-2005/124515 A1 | 12/2005 |

OTHER PUBLICATIONS

"International Search Report for corresponding PCT Application No. PCT/US2005/020373", (Mar. 1, 2006), 5 pgs.

* cited by examiner

*Primary Examiner*—James K. Trujillo
(74) *Attorney, Agent, or Firm*—Schwegman, Lundberg, Woessner, & Kluth, P.A.

(57) ABSTRACT

A system, method and kit for forming a powered communications interface in a computer system having a computer housing. A processor, a power supply and a communications interface are installed in the computer housing. The power supply includes a ground rail, a first power rail having a first nominal voltage and a second power rail having a second nominal voltage. The processor is connected to the power supply and the communications interface. A booster is connected to the first power rail and is used to boost power from the first power rail to a third nominal voltage and to place the third nominal voltage on a third power rail. An externally accessible connector having a ground conductor and first, second and third power conductors is connected to the booster and the power supplies such that, wherein the first conductor is connected to the first power rail, the second conductor is connected to the second power rail and the third conductor is connected to the third power rail.

39 Claims, 6 Drawing Sheets

SYSTEM AND METHOD FOR ROUTING DATA AND POWER TO EXTERNAL DEVICES

FIELD OF THE INVENTION

The present invention is related to data transmission, and more particularly to a system and method for routing power to external devices.

BACKGROUND INFORMATION

Universal Serial Bus (USB) provides both data and power to downstream devices. Under the standard, each USB interface includes two data lines, plus power and ground. The maximum power available under USB for a downstream device is 500 mA@5V (2.5 W). Any device demanding higher power must use an external power source, such as a power brick, eliminating some of the simplicity and advantage of a single cable connection for both power and data.

USB+ was developed as a way of providing additional power to external devices without the use of an external power brick. A USB+ connector defines four additional power pins, providing an additional ground conductor and up to 6 A of +5V, +12V and +24V power. In contrast to the 2.5 W available from standard USB, a single USB+ connector can, therefore, provide up to 144 W of power.

USB ports are standard on any new motherboard today. However, USB+ ports typically are added as either an add-on card to the PC (e.g., a PCI card) or as a standalone USB+ HUB with its own power supply.

In case of the external HUB, the external power supply provides the power distributed to the attached devices via the USB+ connector.

In case of a PCI add-on card the power typically comes from the internal power supply of the PC. The +5V or +12V comes directly from the internal power supply and the +24V is boosted from the +12V.

Today's competitive PC marketplace demands that the size of the internal power supply of the PC be in line with the projected maximum internal power consumption. Installing a larger power supply than required would increase the-cost of the PC. PCs do not, therefore, typically have a great deal of extra power capacity, at least in the low-end units. Therefore, a typical power supply will not have sufficient reserve (unused) power available to provide the up to 144 W that could be required for external USB+ devices.

In addition, while the sum of the reserve power of the power supplies on all different voltage outputs may be sufficient reserve power, it may not match the power requirements. That is, reserve power may be available on the +5V rail where the demand may be needed on the +12V or +24V or vice-versa.

Finally, power demand, and the amount of power that a power supply can provide, vary as a function of time, temperature and operating mode. A PC can be reconfigured by adding either external or internal devices, activating or deactivating high-powered functions.

What is needed is a system and method for routing power to external devices that addresses the issues raised above and other issues that will become apparent in reading the following description of the present invention.

BRIEF DESCRIPTION OF THE DRAWINGS

In the drawings, like numerals describe substantially similar components throughout the several views.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In the following description and claims, the terms "coupled" and connected," along with their derivatives, may be used. It should be understood that these terms are not intended as synonyms for each other. Rather, in particular embodiments, "connected" may be used to indicate that two or more elements are in direct physical or electrical contact with each other. However, "coupled" may also mean that two or more elements are not in direct contact with each other, but yet still co-operate or interact with each other.

As noted above, personal computers do not typically have a great deal of extra power capacity. Furthermore, even if the sum of the reserve power of the power supplies on all different voltage outputs is sufficient to power an external device, the form in which that power is available may not match the needs of the external device. That is, reserve power may be available on the +5V rail where the demand may be needed on the +12V or +24V or vice-versa.

Figure 1:
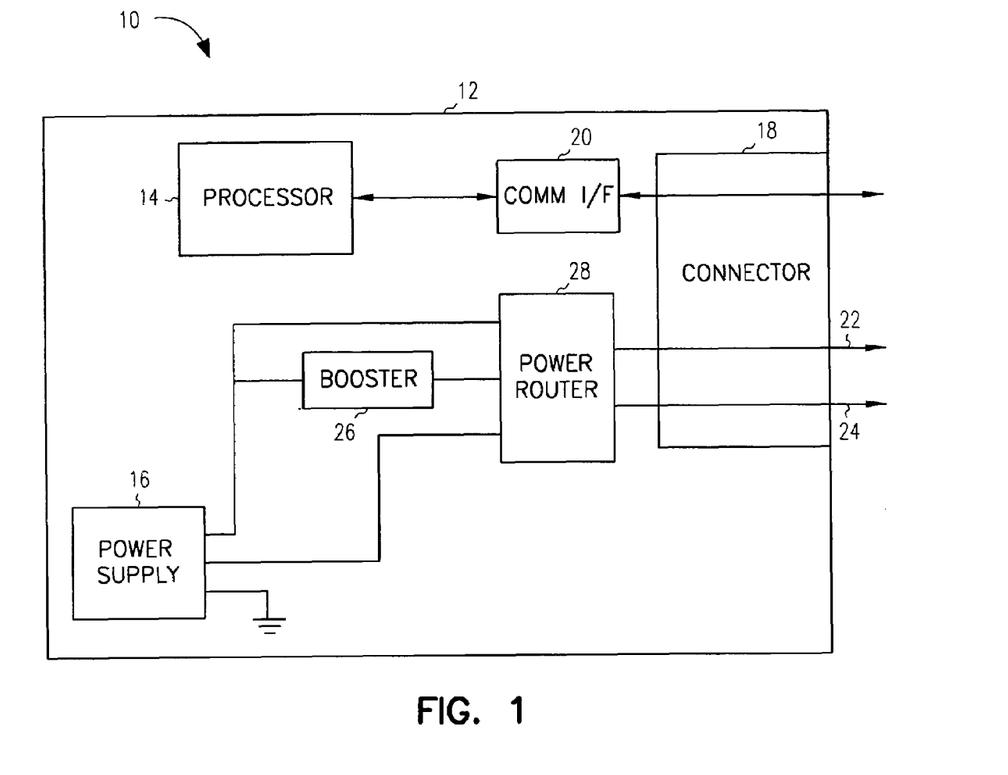
FIG. 1 illustrates a system that routes power from power rails of a power supply to an external device.

A system that routes power dynamically from power rails of a power supply 16 internal to a computer 10 to an external device is shown in FIG. 1. In the example shown in FIG. 1, a computer 10 includes a housing 12. A processor 14, power supply 16 and communications interface 20 are encased within housing 12. In one embodiment (not shown), processor 14 includes communications interface 20.

Processor 14 communicates with external devices through communications interface 20 and connector 18. Connector 18 also includes power conductors 22 and 24 used to supply power to the external devices. In one embodiment, conductors 22 and 24 supply power at a first and a second nominal voltage, respectively. The nominal voltages typically are chosen from +5V, +12V and +24V power levels.

In one embodiment, computer 10 provides the first and second nominal voltages via booster 26 and power router 28. Power router 28 is connected to power supply 16 and to booster 26 and routes power to conductors 22 and 24. One such approach is shown in FIG. 2.

Figure 2:
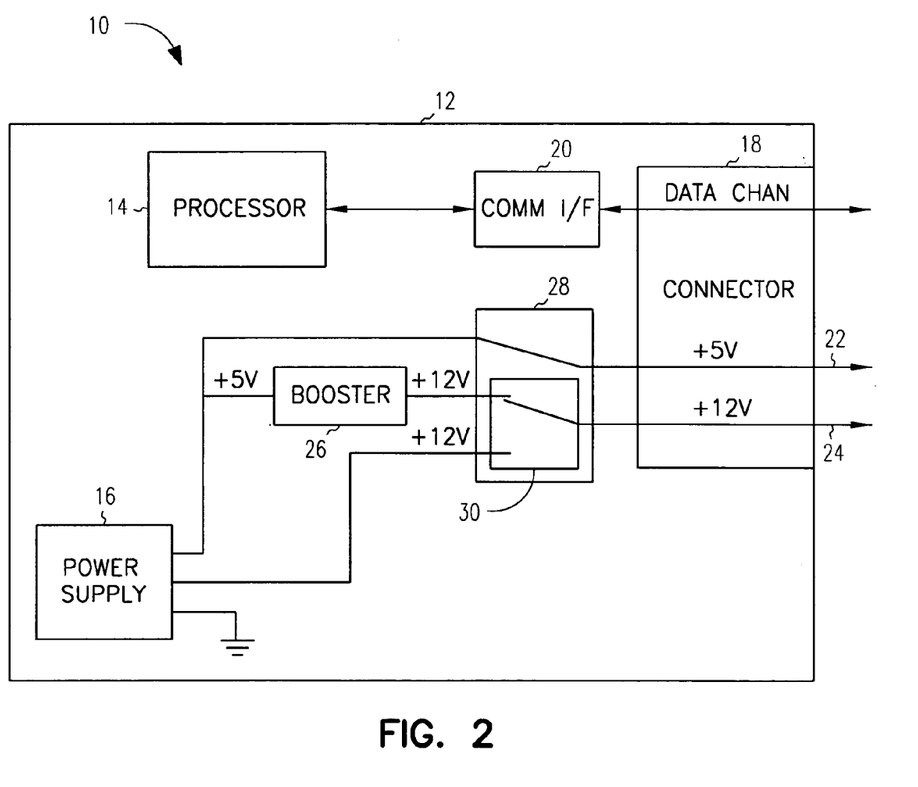
FIGS. 2–4 illustrate embodiments of the system of FIG. 1.

In the embodiment shown in FIG. 2, router 28 includes a switch 30 used to select between a power rail of power supply 16 and the output of booster 26. In one such embodiment, conductor 22 is connected to the +5V rail of power supply 16, while conductor 24 is connected to switch 30. Booster 26 is connected to the +5V rail of power supply 16 and outputs +12V power. Switch 30, then, is used to select between the +12V power rail of power supply 16 and the +12V output of booster 26.

Figure 5:
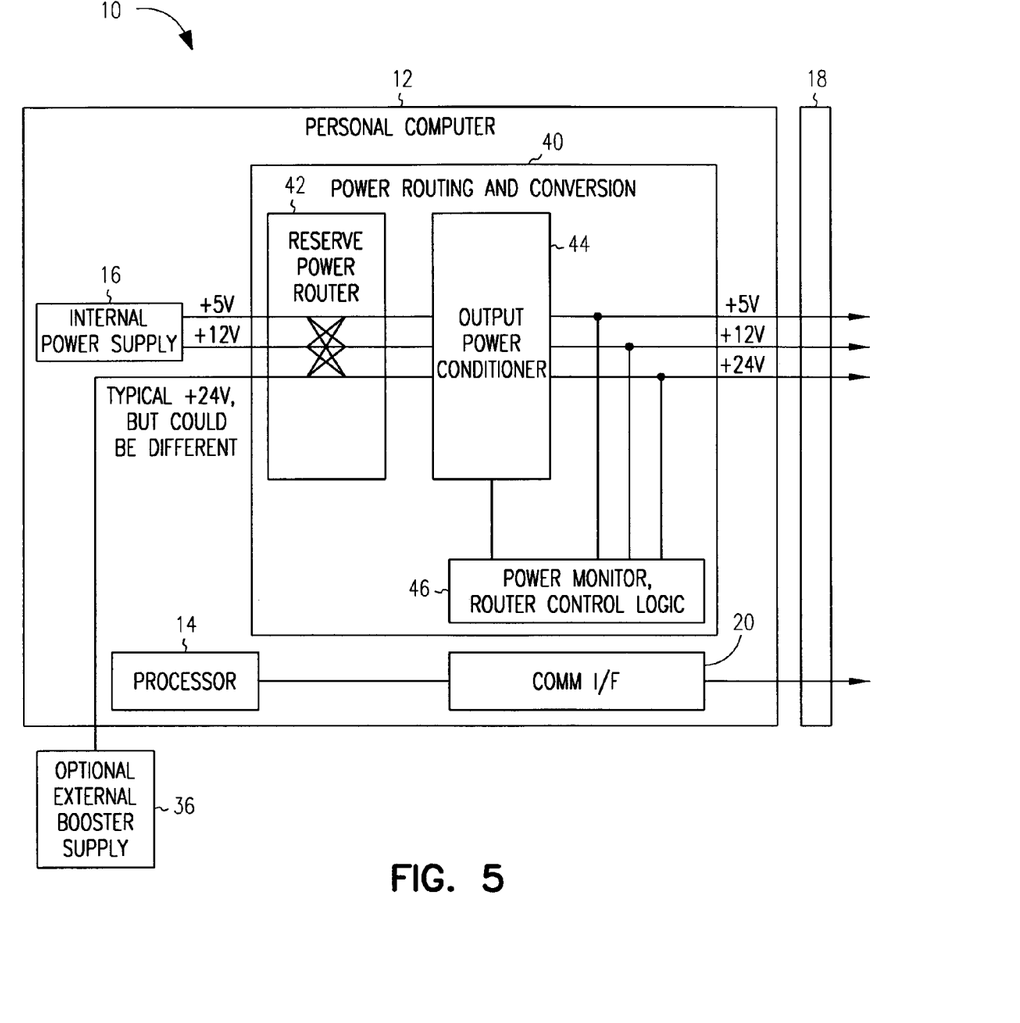
FIG. 5 illustrates a system having a power router which operates automatically to draw power from two or more sources.
Figure 6:
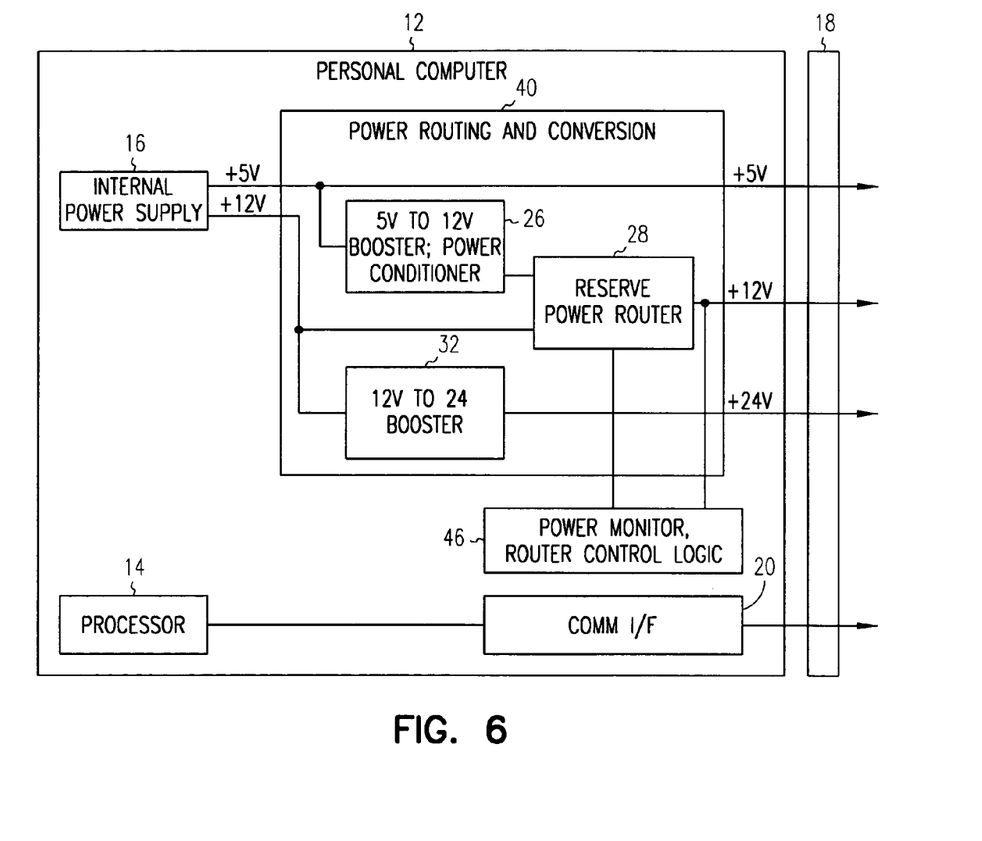
FIG. 6 illustrates an embodiment of the system of FIG. 5.

In one such embodiment, processor 14 senses power demand on each of the +5V and +12V power rails of power supply 16 and sets switch 30 to draw power from the rail with the lowest load. In another embodiment, circuitry other than processor 14 senses power demand on each of the +5V and +12V power rails of power supply 16 and sets switch 30 to draw power from the rail with the lowest load. Such an embodiment is shown in FIGS. 5 and 6 and will be discussed below.

In one embodiment, switch 30 is replaced with a jumper. The routing logic can be as simple as a jumper as long as the user has prior information of the expected power demand.

One embodiment of a manual jumper routing is a configuration where the +12V output is either directly connected to the +12V input or it is generated via power booster circuitry 26 from the +5V output. This reduces demand on the +12V input and leaves more reserves on the +12V input. In one such embodiment, this extra reserve of the +12V input is boosted to +24V and supplies a +24V output (as shown in FIG. 3).

Figure 3:
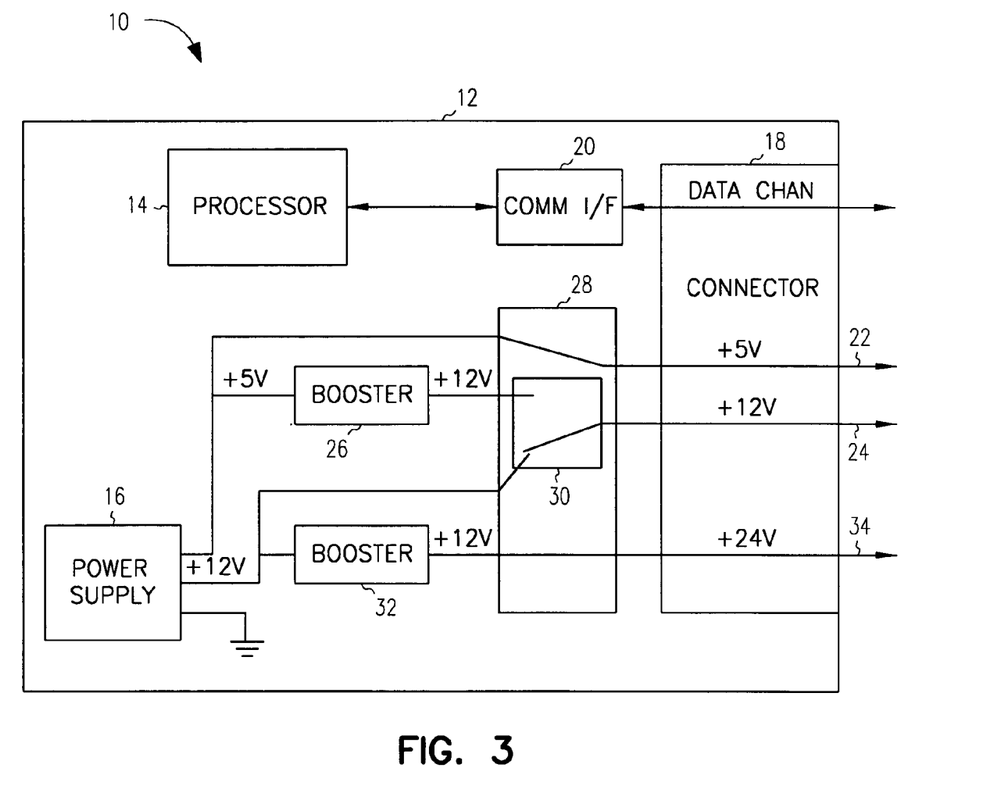

In the embodiment shown in FIG. 3, connector 18 includes a third power conductor 34 connected to a booster 32. In one such embodiment, booster 32 boosts power from the +12V rail of power supply 16 to +24V. In another embodiment (not shown), a booster connected to the +5V rail of power supply 16 provides the boost to +24V.

The dual booster architecture of FIG. 3 has some advantages over the single booster architecture of FIGS. 1 and 2. USB+ devices will primarily use the +12V and +24V output as their power source. A single booster architecture can put the entire high power demand on the +12V power rail, quickly exhausting the reserve power. The dual booster approach distributes this power demand over multiple power rails.

Figure 4:
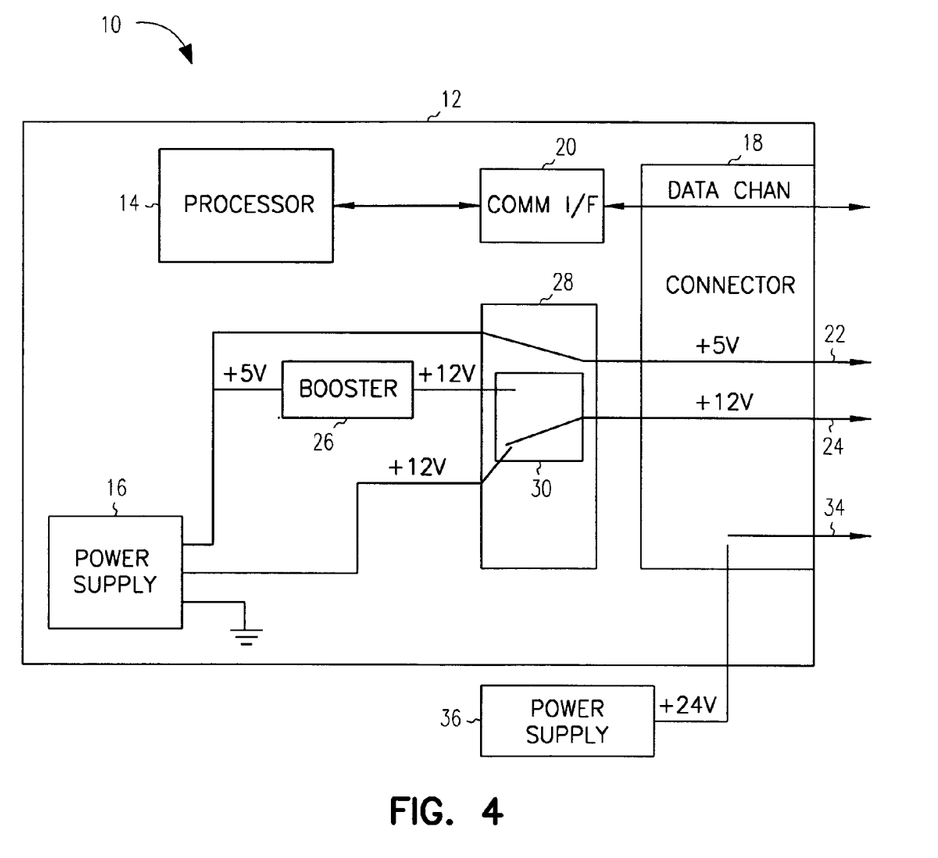

In yet another embodiment, +24V is supplied by an external power supply 36 routed through computer 10 to conductor 34. An example of this is shown in FIG. 4. An optional external power booster supply can also be connected if the overall internal power reserve is not sufficient for the total power demand. The input of this booster supply is typically +24V, but it could be theoretically anything else.

In one embodiment, power router 28 of FIG. 1 monitors, either by itself or in cooperation with processor 14, the load on the +5V and +12V power rails. As power demand increases due to either additional internal or external demand, the corresponding power rail will experience a voltage drop. The power routing circuitry could then route reserve power from power rails having reserve to power rails experiencing heavy demand.

In one embodiment power router 28 operates automatically to draw power from two or more sources. In one such embodiment, automatic routing circuitry includes power-monitoring circuitry. By actively monitoring the output voltage, power router 28 can detect overload of an individual power rail and route additional reserve power to the power rail under heavy demand.

One such embodiment is shown in FIG. 5. In the computer 10 of FIG. 5, internal power supply 16 provides a first and a second power rail (at +5V and +12V, respectively). Power routing and conversion unit 40 receives power from the first and second power rails and outputs power at a first, second and third nominal voltage. In the example shown, the nominal voltages are +5V, +12V and +24V, but any combination of voltages could be supplied in a similar manner. In the embodiment shown, power routing and conversion unit 40 includes reserve power router 42, output power conditioner 44 and control logic 46. Control logic 46 monitors the first, second and third nominal voltages and adjusts the power drawn by reserve power router 42 from the first and second power rails accordingly, driving, for instance, the +12V power conductor with power selectively drawn from the +12V power rail and from the output of booster 26. In one such embodiment, control logic 46 also controls operation of output power conditioner 44.

In one embodiment, power routing and conversion unit 40 employs a dual booster architecture (such as is shown in FIG. 3). Such an embodiment is shown in FIG. 6. In the embodiment shown in FIG. 6, the +24V output is boosted out of the +12V power rail and the +12V output is primarily generated from the +12V power rail as well. The +12V output is, however, monitored continuously by control logic 46 and, upon detecting a pre-set minimum threshold, the secondary +5V to +12V booster circuit transfers reserve power from the +5V into the +12V power rail.

One might, for instance, connect a device to the +24V. The primary power booster will transfer power from the +12V input to the +24V output. Additional devices connected either to the +12V or +24V will put more demand on the +12V output causing it to drop the voltage and reaching the minimum threshold. At that point the secondary +5V to +12V booster will transfer power into the +12V rail.

In another embodiment, power routing and conversion unit 40 employs a single booster with external power supply 36 such as is shown in FIG. 4. In one such embodiment, power routing and conversion unit 40 uses the +24V power input of external power supply 36 to supplement the power available on the +12V or +5V outputs.

The embodiments shown in FIGS. 1–6 could also be sold as kits used to retrofit existing computer systems 10. For instance, a PCI card could be used to add powered USB to a computer system. In one such embodiment, power routing and conversion unit 40 would be provided with a USB controller in a PCI card form factor in order to provide powered USB. Other serial and parallel communications interfaces could be provided in a similar manner. In one such embodiment, the PCI card includes a connector for connecting the card to an external power supply (such as external power supply 36 shown in FIGS. 4 and 5).

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of providing power to external devices connected to a computer having a computer housing, wherein the computer housing includes an externally accessible connector having power and ground conductors, the method comprising:

installing a power supply in the computer housing, wherein the power supply includes a ground and a first and a second power rail, wherein the first power rail is at a first nominal voltage and the second power rail is at a second nominal voltage;

connecting a booster to the first power rail, wherein the booster includes a booster output and wherein the booster output is at the second nominal voltage;

connecting the second power rail and the output of the booster to a power router; and driving the power conductor with power selectively drawn from the second power rail and from the booster output.

2. The method according to claim 1, wherein the method further comprises connecting the power and ground conductors to the external device.

3. The method according to claim 1, wherein driving the first power conductor includes installing a jumper to connect the second power rail to the first power conductor.

4. The method according to claim 1, wherein driving the first power conductor includes installing a jumper to connect the booster output to the first power conductor.

5. The method according to claim 1, wherein driving the first power conductor includes selectively coupling power from the second power rail and the booster output to the first power conductor.

6. The method according to claim 1, wherein driving the first power conductor includes:
sensing a voltage on the first power conductor; and
drawing power from the second power rail and the booster output as a ifinction of the voltage sensed on the first power conductor.

7. A method of providing power to external devices connected to a computer having a computer housing, wherein the computer housing includes an externally accessible connector having a ground conductor and first and second power conductors, the method comprising:
installing a power supply in the computer housing, wherein the power supply includes a ground and a first and a second power rail, wherein the first power rail is at a first nominal voltage and the second power rail is at a second nominal voltage;
connecting a first booster to the first power rail, wherein the first booster includes a booster output and wherein the booster output is at the second nominal voltage;
connecting a second booster to the second power rail, wherein the second booster outputs power at a third nominal voltage;
connecting an output of the second booster to the second power conductor;
connecting the second power rail and the output of the first booster to a power router; and
driving the first power conductor with power selectively drawn from the second power rail and from the booster output.

8. The method according to claim 7, wherein the method further comprises connecting the power and ground conductors to the external device.

9. The method according to claim 7, wherein driving the first power conductor includes installing a jumper to connect the second power rail to the first power conductor.

10. The method according to claim 7, wherein driving the first power conductor includes installing a jumper to connect the booster output to the first power conductor.

11. The method according to claim 7, wherein driving the first power conductor includes selectively coupling power from the second power rail and the booster output to the first power conductor.

12. The method according to claim 7, wherein driving the first power conductor includes:
sensing a voltage on the first power conductor; and
drawing power from the second power rail and the booster output as a function of the voltage sensed on the first power conductor.

13. A computer system, comprising:
a computer housing;
a processor installed in the computer housing;
a communications interface, connected to the processor, for communicating with an external device;
a power supply installed in the computer housing, wherein the power supply is connected to the processor and wherein the power supply includes a ground rail, a first power rail having a first nominal voltage and a second power rail having a second nominal voltage;
an externally accessible connector installed in the computer housing, wherein the connector is connected to the communications interface and includes a ground conductor and first and second power conductors;
a first booster connected to the first power rail, wherein the booster boosts power from the first power rail to a voltage approximately equal to the second nominal voltage; and
power routing means, connected to the first booster, the second power rail and the connector, for connecting the first power rail to the second power conductor and for selectively outputting power from the first booster and the second power rail to the first power conductor.

14. The computer system of claim 13, wherein the communications interface includes a serial communications interface.

15. The computer system of claim 13, wherein the communications interface includes a universal serial bus (USB) interface.

16. The computer system of claim 13, wherein the communications interface includes a parallel communications interface.

17. A computer system, comprising:
a computer housing;
a processor installed in the computer housing;
a communications interface, connected to the processor, for communicating with an external device;
a power supply installed in the computer housing, wherein the power supply is connected to the processor and wherein the power supply includes a ground rail, a first power rail having a first nominal voltage and a second power rail having a second nominal voltage;
a third power rail;
a booster connected to the first power rail, wherein the booster boosts power from the first power rail to a third nominal voltage and outputs the third nominal voltage on the third power rail; and
routing logic connected to the first and second power rails and to a power conductor. wherein the routing logic drives the power conductor at the first nominal voltage with power selectively drawn from the first and second power rails.

18. The computer system of claim 17, wherein the computer system further includes an externally accessible connector installed in the computer housing, wherein the connector is connected to the communications interface and includes a ground conductor and first, second and third power conductors, wherein the first conductor is connected to the first power rail, the second conductor is connected to the second power rail and the third conductor is connected to the third power rail.

19. The computer system of claim 18, wherein the communications interface includes a serial communications interface.

20. The computer system of claim 18, wherein the communications interface includes a universal serial bus (USB) interface.

21. The computer system of claim 18, wherein the communications interface includes a parallel communications interface.

22. The computer system of claim 17, wherein the routing logic is connected to an external power supply and draws power selectively from the external power supply.

23. A computer system, comprising:
- a computer housing;
- a processor installed in the computer housing;
- a power supply installed in the computer housing, wherein the power supply is connected to the processor and wherein the power supply includes a ground rail, a first power rail having a first nominal voltage and a second power rail having a second nominal voltage;
- a first booster connected to the first power rail, wherein the first booster boosts power from the first power rail to a voltage approximately equal to the second nominal voltage;
- a second booster connected to the second power rail, wherein the second booster boosts power from the second power rail to a third nominal voltage;
- power routing means, connected to the first booster and the second power rail, for selectively routing power from the first booster and the second power rail; and
- an externally accessible connector installed in the computer housing, wherein the connector includes a ground conductor and first, second and third power conductors, wherein the first conductor is connected to the first power rail, the second conductor is connected to the power routing means and the third conductor is connected to an output of the second power booster.

24. The computer system of claim 23, wherein the processor includes a communications interface for communicating with an external device and wherein the connector is connected to the communications interface.

25. The computer system of claim 24, wherein the communications interface includes a serial communications interface.

26. The computer system of claim 24, wherein the communications interface includes a universal serial bus (USB) interface.

27. The computer system of claim 24, wherein the communications interface includes a parallel communications interface.

28. A kit for adding a powered connector to a computer system having a computer housing, a processor installed in the computer housing and a power supply installed in the computer housing, wherein the power supply is connected to the processor and wherein the power supply includes a ground rail, a first power rail having a first nominal voltage and a second power rail having a second nominal voltage, the kit comprising:
- a booster which can be connected to the first power rail, wherein the booster is capable of boosting power from the first power rail to the second nominal voltage;
- power routing logic connected to the booster and the second power rail; and an externally accessible connector, wherein the connector includes a ground conductor and first, second and third power conductors, wherein the first conductor is connected to the first power rail, the second conductor is connected to the power routing logic and the third conductor is connected to the power routing logic;
- wherein the power routing logic drives the second conductor at the second nominal voltage with power selectively drawn from the booster and the second power rail; and
- wherein the power routing logic drives the third conductor at the third nominal voltage.

29. The kit according to claim 28, wherein the connector includes means for connecting to a communications interface which can be used to communicate with an external device.

30. The kit according to claim 29, wherein the connector includes a serial communications interface connector.

31. The kit according to claim 29, wherein the connector includes a universal serial bus (USB) interface connector.

32. The kit according to claim 29, wherein the connector includes a parallel communications interface connector.

33. The computer system of claim 27, wherein the power routing logic is connected to an external power supply and draws power selectively from the external power supply.

34. The computer system of claim 27, wherein the power routing logic includes a power routing logic booster connected to second power rail and wherein the power routing logic drives the third conductor at the third nominal voltage with power selectively drawn from the power routing logic booster and the third power rail.

35. A kit for adding a powered connector to a computer system having a computer housing, a processor installed in the computer housing and a power supply installed in the computer housing, wherein the power supply is connected to the processor and wherein the power supply includes a ground rail, a first power rail having a first nominal voltage and a second power rail having a second nominal voltage, the kit comprising:
- a first booster which can be connected to the first power rail, wherein the first booster is capable of boosting power from the first power rail to a voltage approximately equal to the second nominal voltage;
- a second booster which can be connected to the second power rail, wherein the second booster is capable of boosting power from the second power rail to a third nominal voltage;
- power routing means, connected to the first booster, for selectively routing power from the first booster and the second power rail; and
- an externally accessible connector, wherein the connector includes a ground conductor and first, second and third power conductors, wherein the first conductor is connected to the first power rail, the second conductor is connected to the power routing means and the third conductor is connected to an output of the second power booster.

36. The kit according to claim 35, wherein the connector includes means for connecting to a communications interface which can be used to communicate with an external device.

37. The kit according to claim 36, wherein the connector includes a serial communications interface connector.

38. The kit according to claim 36, wherein the connector includes a universal serial bus (USB) interface connector.

39. The kit according to claim 36, wherein the connector includes a parallel communications interface connector.

* * * * *

UNITED STATES PATENT AND TRADEMARK OFFICE
CERTIFICATE OF CORRECTION

PATENT NO. : 7,240,229 B2  Page 1 of 1
APPLICATION NO. : 10/865018
DATED : July 3, 2007
INVENTOR(S) : Frank

It is certified that error appears in the above-identified patent and that said Letters Patent is hereby corrected as shown below:

Column 5, line 21, in Claim 6, delete "ifinction" and insert -- function --, therefor.

Column 6, line 46, in Claim 17, after "conductor" delete "." and insert -- , --, therefor.

Signed and Sealed this

Eleventh Day of September, 2007

JON W. DUDAS
*Director of the United States Patent and Trademark Office*